(12) United States Patent
Mirmirani (10) Patent No.: US 11,172,240 B2
(45) Date of Patent: Nov. 9, 2021

(54) CONTENT LOADING THROUGH AD-HOC WIRELESS NETWORKS BETWEEN AIRCRAFT ON THE GROUND

(71) Applicant: Panasonic Avionics Corporation, Lake Forest, CA (US)

(72) Inventor: Amir Ali Mirmirani, Mission Viejo, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 58 days.

(21) Appl. No.: 16/673,866

(22) Filed: Nov. 4, 2019

(65) Prior Publication Data

US 2021/0136426 A1 May 6, 2021

(51) Int. Cl.
| | |
|---|---|
| *H04N 21/2385* | (2011.01) |
| *H04N 21/239* | (2011.01) |
| *H04W 84/12* | (2009.01) |
| *B64D 11/00* | (2006.01) |
| *H04W 76/14* | (2018.01) |
| *H04N 21/845* | (2011.01) |

(52) U.S. Cl.
CPC ... *H04N 21/2385* (2013.01); *B64D 11/00155* (2014.12); *H04N 21/2393* (2013.01); *H04N 21/845* (2013.01); *H04W 76/14* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 8,340,067 B2 | 12/2012 | Buga et al. | |
| 9,967,595 B1 | 5/2018 | Provost et al. | |
| 10,390,053 B2* | 8/2019 | Boussemart | H04W 4/08 |
| 2003/0203734 A1* | 10/2003 | Igloi | H04L 69/329 |
| | | | 455/431 |
| 2004/0133907 A1* | 7/2004 | Rodriguez | H04N 21/26208 |
| | | | 725/14 |
| 2005/0090201 A1 | 4/2005 | Lengies et al. | |
| 2007/0195808 A1* | 8/2007 | Ehrlich | H04L 45/04 |
| | | | 370/408 |

(Continued)

*Primary Examiner* — Alexander Q Huerta
(74) *Attorney, Agent, or Firm* — Perkins Coie LLP (57) ABSTRACT

A content distribution apparatus onboard a vehicle periodically travelling within direct communicative range of other content distribution apparatuses onboard respective other vehicles has a storage interface to a local content data repository, and a mesh network interface establishing mesh network data communications links with the content distribution apparatuses. A comparator is in communication with the local content data repository over the storage interface, and a missing content segments list is generated by the comparator based upon an evaluation of a master content list against a local inventory of the segments of content data. The missing content data is retrieved from one or more upstream source content distribution apparatuses over a first mesh network data communications link. The content data in the local inventory is also transmitted to a downstream requestor content distribution apparatus over a second mesh network data communications link.

20 Claims, 5 Drawing Sheets

(56) References Cited

U.S. PATENT DOCUMENTS

| | | | |
|---|---|---|---|
| 2008/0016527 A1* | 1/2008 | Ching | H04L 65/4084 |
| | | | 725/36 |
| 2008/0070517 A1* | 3/2008 | Brady | H04B 7/18506 |
| | | | 455/98 |
| 2011/0028178 A1 | 2/2011 | Brady, Jr. et al. | |
| 2012/0003922 A1* | 1/2012 | Buga | H04B 7/18506 |
| | | | 455/3.01 |
| 2012/0090011 A1* | 4/2012 | Ezaki | H04N 21/2181 |
| | | | 725/76 |
| 2014/0011441 A1* | 1/2014 | Lauer | H04W 84/005 |
| | | | 455/3.06 |
| 2018/0027037 A1* | 1/2018 | Watson | H04L 67/2842 |
| | | | 709/219 |
| 2018/0027070 A1* | 1/2018 | Jhanji | H04L 67/1091 |
| | | | 709/217 |
| 2019/0037372 A1 | 1/2019 | Girard et al. | |
| 2019/0043369 A1* | 2/2019 | Miller | G08G 5/0008 |
| 2019/0182318 A1 | 6/2019 | Haebler et al. | |

* cited by examiner

CONTENT LOADING THROUGH AD-HOC WIRELESS NETWORKS BETWEEN AIRCRAFT ON THE GROUND

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to data communications devices for vehicles, in particular, aircraft. More specifically, the present disclosure relates to content loading through ad-hoc wireless networks between aircraft on the ground.

2. Related Art

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips an airline passenger has some idle time, which the passenger may occupy with work, leisure, and/or rest.

Many passengers bring their own personal electronic devices such as smart phones, media players, electronic readers, tablets, laptop computers, and so forth, for the express purpose of keeping occupied, but airlines also accommodate its customers with in-flight entertainment and communications (IFEC) systems. Although the specific installation may vary depending on the service class, each passenger seat is equipped with a display device, an audio output modality, an input modality such as a remote control, and a terminal unit. Generally, the terminal unit may generate video and audio signals, receive inputs from the remote control, and execute pre-programmed instructions in response thereto. The display device is typically an LCD screen that is installed on the seatback of the row in front of the passenger, though in some cases it may be mounted to a bulkhead or retractable arm or the like that is in turn mounted to the passenger's seat. Furthermore, the audio output modality is a headphone jack, to which a headphone, either supplied by the airline or by the passenger, may be connected.

Via the display and the audio outputs, a wide variety of multimedia content can be presented to the passenger. Recently released movies are a popular viewing choice, as are television shows such as news programs, situation and stand-up comedies, documentaries, and so on. Useful information about the destination such as airport disembarking procedures, immigration and custom procedures and the like is also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger using the remote control, which may also have alternative uses, namely, for navigating through the vast multimedia content library and making selections thereof for viewing and/or listening. Thus, the terminal unit may also include a content selection application with a graphical user interface, through which such navigation of the multimedia content library is possible. The foregoing types of programming that can be presented to the passenger via the in-flight entertainment system will henceforth be generally referred to as multimedia content.

The multimedia content is encoded and stored as digital data, with a video decoder and audio decoder of the terminal unit functioning to generate the aforementioned video and audio signals therefrom. It is desirable to have a wide range of different multimedia content to satisfy the varying tastes of passengers. It is also desirable to have a sufficient volume of multimedia content so that passengers can remain occupied with entertainment for the entire duration of the flight. Accordingly, the multimedia content stored onboard the aircraft can range in the hundreds of gigabytes, if not over a terabyte. The majority of the data comprises the video programming, although the audio and video game content may be significant as well. This data is typically not stored on each individual terminal unit, but rather, in a central content server also onboard the aircraft. In this regard, the terminal unit is understood to incorporate networking modalities such as Ethernet to establish data communications with the central content server. Once a particular selection of multimedia content is requested by the passenger via the content selection application, the terminal unit may retrieve the same from the central content server, decode the data, and present it to the passenger.

As important as variety and volume may be in regards to the multimedia content, novelty is as important for airlines to keep its passengers engaged with the in-flight entertainment system, particularly for valuable frequent fliers. Thus, the multimedia content stored on the content server must be frequently updated. Due to the large volume of data involved, a portable content loader that is generally comprised of a hard disk drive, an optical drive, or a solid state drive loaded with the update data is physically carried onboard while the aircraft is on the ground and connected to the central content server. A download or copy process is then initiated, and once complete, the portable content loader is disconnected and removed from the aircraft.

In part because of the laborious manual procedures involved, this update process typically takes place on a periodic schedule, preferably during a layover between flights, such as when aircraft maintenance is conducted. It would be desirable for new multimedia content to be made available on a more frequent basis, incorporating programming that may be only days or even a few hours old. Yet, the expense and labor involved with the use of specialized content loader devices may preclude such an aggressive update schedule, and these issues are particularly acute for large fleets of aircraft.

Aircraft-installed content loaders may be used to connect to content repositories over WiFi or cellular communications modalities while the aircraft is parked at or near the gate. Although Wi-Fi access is the least costly because there are no usage charges, setting up an access point at every airport, and for every terminal in the airport at which the aircraft may stop, requires setting up a substantial ground-based infrastructure. Cellular communications, on the other hand, typically have usage costs as well as roaming charges to the extent the aircraft is located in a non-native coverage area. Satellite downlink-based content loaders are also known in the art, though additional power requirements and narrow and costly bandwidth has limited its use. Conventional content transfer modalities relying upon cellular or satellite data links, however, are inefficient and expensive, as each aircraft downloaded the content at least once.

Accordingly, there is a need in the art for eliminating redundancy for content transfers to aircraft IFEC systems over cellular and/or satellite links and reduce the overall amount of data transferred over such metered connections. There is also a desire to shift some of the burden of such transfers to free communications modalities such as WiFi. Thus there is a need for content loading through ad-hoc wireless networks between aircraft on the ground.

BRIEF SUMMARY

The embodiments of the present disclosure involves the creation of local area wireless mesh networks between aircraft to transfer content, or segments of contents, and propagating such data to each of the aircraft on the mesh network. When within direct wireless communication range, the content distribution systems on each of the aircraft establish the mesh network, and determine which nodes need which content or content segments, and begin uploading/downloading the same. The use of costly cellular network connections may be minimized, because the bulk of the transfer is envisioned to take place over the local area wireless (WiFi) network. The speed of the contemplated ad-hoc network is understood to be better than the cellular networks as well, and where there are two or more aircraft with the vicinity of each other, content distribution may take place without cellular modalities.

One embodiment may be a content distribution apparatus onboard a vehicle that periodically travels within direct communicative range of other content distribution apparatuses onboard respective other vehicles. The apparatus may include a storage interface to a local content data repository. One or more segments of content data may be stored on the local content data repository. Additionally, the apparatus may include a mesh network interface that establishes one or more mesh network data communications links with one or more other content distribution apparatuses of the other vehicles while being within direct communicative range thereof. The apparatus may also include a comparator that is in communication with the local content data repository over the storage interface. A missing content segments list may be generated by the comparator based upon an evaluation of a master content list of each segment of content data available from a remote content server against a local inventory of the segments of content data stored in the local content data repository. The comparator may further request one or more segments of the content data in the missing content segments list from one or more upstream source content distribution apparatus. This request may take place over a first one of the mesh network data communications links. The comparator may also transmit one or more segments of the content data in the local inventory that are stored in the local content data repository. This transmission may be in response to a request therefor from a downstream requestor content distribution apparatus, and take place over a second one of the mesh network data communications links.

Another embodiment may be a system for wirelessly distributing multimedia content to in-flight entertainment systems of a plurality of aircraft. The system may include a first distribution network node connectible to a remote content server over a first direct communications link. The first distribution network node may receive a master content list of a plurality of segments of the multimedia content available from the remote content server. The first distribution network node may also include a first local data repository to store at least one of the plurality of segments of the multimedia content. The system may have a second distribution network node selectively connectible to the remote content server over a second direct communications link and the first distribution network node over a first mesh network connection link therewith. The second distribution network node may include a second local data repository to store one or more of the plurality of segments of the multimedia content retrieved from the first distribution network node based upon an evaluation of the first mesh network connection link and the second direct communications link.

Still another embodiment of the present disclosure may be a method for distributing multimedia content to in-flight entertainment and communications systems. The method may include a step of initiating a first mesh network data communications link with a first content distribution apparatus on a second aircraft upon being within direct communicative range thereof. There may also be a step of retrieving a master content list of a plurality of segments of content data available from a remote content sever. The method may further include generating a local inventory of segments of content data stored on a local data repository, as well as a step of generating a missing content segments list based upon a comparison of the master content list against the local inventory. The method may include selectively retrieving the segments of content data identified in the missing content segments list from either one or both of the remote content server over a first data communications link, and the first content distribution apparatus over the first mesh network data communications link. This method may be implemented as instructions executable by the in-flight entertainment and communications system, and may be embodied in a non-transitory computer-readable medium.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of distributing content through ad-hoc wireless networks between aircraft. This description is not intended to represent the only form in which the embodiments of the disclosure may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
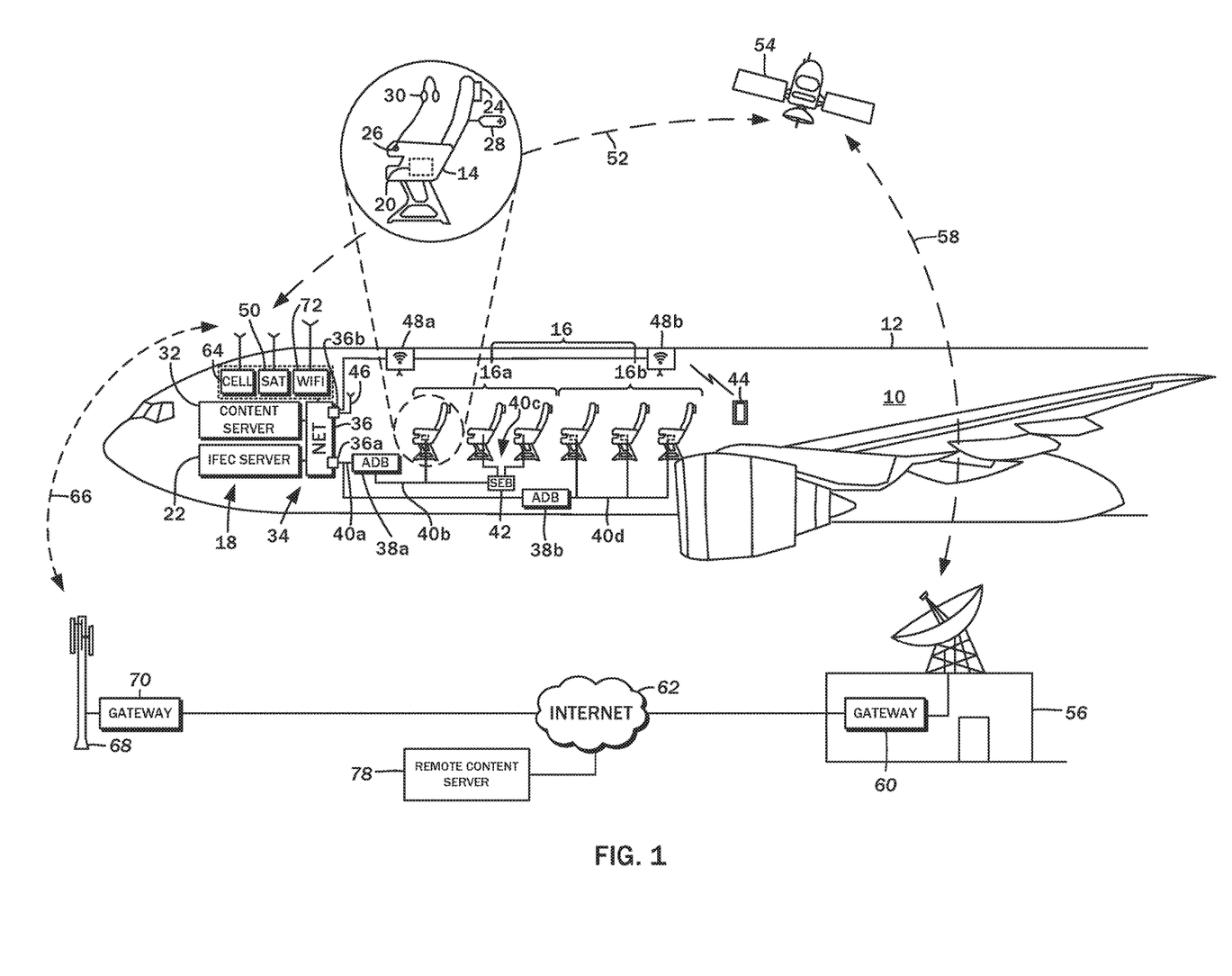
FIG. 1 is a block diagram of an exemplary aircraft environment in which one aspect of the presently disclosed system for distributing content through ad-hoc wireless networks between aircraft may be implemented.

FIG. 1 is a simplified diagram of an aircraft 10, generally referred to herein as a vehicle, along with select subsystems and components thereof. Within a fuselage 12 of the aircraft 10, there may be seats 14 arranged over multiple rows 16, with each seat 14 accommodating a single passenger. Although the features of the present disclosure will be described in the context of the aircraft 10, this is by way of example only and not of limitation. The presently disclosed embodiments content distribution system may be applicable to other contexts as appropriate, such as, by way of non-limiting illustrative example, busses, trains, ships, and other types of vehicles.

Installed in the aircraft 10 is an in-flight entertainment and communications (IFEC) system 18, through which various entertainment and connectivity services may be provided to passengers while onboard. When referenced generally, the IFEC system 18 is understood to encompass terminal devices 20 installed for each seat 14, as well as the IFEC server 22 and the other components involved in the delivery of the entertainment and communications functionality. In the illustrated example, this includes a display 24, an audio output 26, and a remote controller or handset 28. For a given row 16 of seats 14, the terminal device 20 and the audio output 26 are disposed on the seat 14 for which it is provided, but the display 24 and the handset 28 may be located on the row 16 in front of the seat 14 to which it is provided. That is, the display 24 and the handset 28 are installed on the seatback of the row in front of the seat. Other display 24 and handset 28 mounting and access configurations such as a retractable arm or the like mounted to an armrest of the seat 14 or by mounting on a bulkhead are also possible.

The display 24 is understood to be a conventional liquid crystal display (LCD) screen or other type with a low profile that is suitable for installation on the seatback. Each passenger can utilize an individual headset 30, supplied by either the airline or by the passenger, which provides a more private listening experience. The audio output 26 may be a headphone jack that is a standard ring/tip/sleeve socket. The headphone jack may be disposed in proximity to the display 24 or on the armrest of the seat 14 as shown. The headphone jack may be an active type with noise canceling and including two or three sockets or a standard audio output without noise canceling. Each display 24 may incorporate the aforementioned terminal device 20 to form a unit referred to in the art as a smart monitor.

A common use for the terminal device 20 installed on the aircraft 10 is the playback of various multimedia content. The terminal device 20 may be implemented with a general-purpose data processor that decodes the data files corresponding to the multimedia content and generates video and audio signals for the display 24 and the audio output 26, respectively. The multimedia content data files may be stored in one or more content servers 32, and streamed to specific terminal devices 20 upon request. The content may be encrypted, so the digital rights management functionality to enable streaming/playback may be performed by the IFEC server 22. Functionality not pertaining to the delivery of multimedia content, such as relaying imagery from external aircraft cameras, flight path/mapping information, and the like may also be performed by the IFEC server 22.

The passenger can play games being executed on the terminal device 20 and otherwise interact with the multimedia content with the handset 28. Navigating through the vast multimedia content library and selecting ones for viewing and/or listening is also possible with the handset 28, though in some different installations, a touch-screen display may be provided for a more intuitive interaction with the multimedia content library. In either case, the terminal device 20 is loaded with a content selection software application that is executed by the data processor and accepts input from the handset 28 or other input modality and generates a response on the graphical interface presented on the display 24.

Each of the terminal devices 20 for the seats 14 may be connected to the IFEC server 22, the content server 32, or any other server that is part of the IFEC system 18 over a local area network 34, one segment of which may preferably be Ethernet. The IFEC system 18 thus also includes a data communications module 36, and more specifically, an Ethernet data communications module 36a, e.g., an Ethernet switch or router that has a transmitter, a receiver, and an interface port receptive to a plug/cable. In a typical aircraft installation, the data communications module 36 is understood to be a separate line replaceable unit (LRU), and may also be referred to as a network controller (NC). Likewise, the IFEC server 22, the content server 32, and the other servers onboard the aircraft 10 are understood be standalone computer systems with one or more general purpose data processors, memory, secondary storage, and a network interface device for connecting to the local area network 34. The computer systems may have an operating system installed thereon, along with server applications (e.g., web servers, streaming servers, and so forth) providing various in-flight entertainment/communications services in cooperation with the terminal devices 20 connected thereto.

The local area network 34 may be logically separated into tiered segments, with the network controller/data communications module 36 being at the top of the hierarchy or central to all of the segments. The smart monitors/terminal devices 20 may be organized according to sections, rows, or columns of seats 14, and the local area network 34 may be structured accordingly.

There may be a first area distribution box (ADB) 38a, which may also be a line replaceable unit that is directly connected to the network controller/data communications module 36 and establishes a segment of the local area network 34 for a first set of rows 16a. Connected to the first ADB 38a over a downstream network segment 40b may be the smart monitors/terminal device 20. In some implementations, there may be an additional seat electronic box (SEB) 42 that handles some data processing operations shared amongst multiple smart monitors. The further downstream network segments 40c may be shared with the peripheral devices connected to the smart monitor such as a credit card reader on the handset 28, a USB port, and the like.

A second ADB 38b is also directly connected to the network controller/data communications module 36, and is also part of the same network segment 40a. The second ADB 38b is understood to be dedicated for the second set of rows 16b, with individual connections to each of the smart monitors/terminal devices 20 defining a network segment 40d. Although different network segmentation hierarchies are illustrated, for example, one set of seats 14 being connected to an SEB 42, which in turn is connected to the ADB 38a, along with a direct connection between the smart monitor/terminal device 20 to the ADB 38b, a typical aircraft configuration will be consistently structured.

Passengers and cabin crew alike may utilize a portable electronic device (PED) 44 during flight. PEDs 44 are understood to refer to smart phones, tablet computers, laptop computers, and other like devices that include a general purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

Conventional PEDs 44 are understood to incorporate a WLAN (WiFi) module, so the data communications module 36 of the IFEC system 18 includes a WLAN access point 46a that is connected over a local wireless network interface 36b. The PED 44, via the onboard WLAN network, may connect to the IFEC system 18 to access various services offered thereon such as content downloading/viewing, shopping, and so forth. Typically, a single WLAN access point 46 is insufficient for providing wireless connectivity throughout the cabin, so additional WLAN access points 48a, and 48b may be installed at various locations spaced apart from each other. These additional WLAN access points 48a, 48b may be connected to the network controller/data communications module 36 over an Ethernet link that is part of the aforementioned local area network 34. The local area network interface or data communications module 36 is understood to encompass the hardware components such as the WLAN transceiver, antennas, and related circuitry, the Ethernet router/switch, as well as the software drivers that interface the hardware components to the other software modules of the IFEC system 18.

Due to the speed/bandwidth limitations associated with current implementations of WiFi and other wireless data networking modalities, the communications between each of the terminal devices 20 and the IFEC server 22, content server 32, and other servers is understood to be over the wired local area network 34. However, it will be appreciated that this is by way of example only and not of limitation. Future wireless networking modalities may bring substantial improvements in transfer speed and available bandwidth such that all of the terminal devices 20 are connected wirelessly. Indeed, this would be desirable because in the weight-restricted context of aircraft installations, the elimination of cables and associated switch/router interfaces would improve aircraft operational efficiency. In this regard, the alternative WiFi data communications module 36b is being presented to illustrate the possibility of utilizing other data networking modalities beyond the wired local area network 34.

In addition to the foregoing data communications network established onboard the aircraft 10, according to various embodiments, modalities for enabling communications to nodes beyond the confines of the aircraft 10 may be deployed for implementing the features of the content distribution system. One such modality is a satellite module 50 that establishes an uplink 52 to a communications satellite 54. In this regard, the satellite module 50 includes transmit and receive circuitry, as well as antennas and other components that are used to implement the uplink 52 to the communications satellite 54. The satellite module 50 may be implemented as part of the data communications module 36, or as a separate line replaceable unit that is connected to the data communications module 36 over a high speed data bus. In one example embodiment, the uplink 52 may be a Ku-band microwave transmission link. However, any suitable communications satellite 54 such as Inmarsat or Iridium may also be utilized without departing from the present disclosure. The data transmitted to the communications satellite 54 is relayed to a satellite communications service provider 56 over a downlink 58. The satellite communications service provider 56, in turn, includes a network gateway 60 with a connection to the Internet 62 or other wide area network, such that data traffic from the aircraft 10 may be routed to a node thereon. Additionally, data traffic from the Internet 62 or other wide area network may be passed to the network gateway 60 for transmission to the aircraft 10 via the communications satellite 54 over the downlink 58 and the uplink 52.

The aircraft 10 may also be equipped with a cellular modem 64 that establishes a bi-directional communications link, also referred to as a cellular network connection 66, with one or more ground-based cellular towers 68. A variety of mobile communications technologies such as Global System for Mobile communications (GSM), 4G/Long Term Evolution (LTE), 5G, and so forth may be utilized for remote connectivity. The data traffic to and from the cellular towers 68 may be routed to the Internet 62 over another gateway 70. As will be described in further detail below, the cellular network connection 66 may be used to transfer data to the aircraft 10, and specifically the IFEC system 18. Thus, the cellular modem 64 may also be implemented as part of the data communications module 36, or as a separate line replaceable unit that is connected to the data communications module 36 over a high speed data bus.

Various embodiments of the present disclosure also contemplate the use of an external Wireless Local Area Network (WLAN) or WiFi connection to transfer data to and from the IFEC system 18. In this regard, the aircraft 10 may include an external WiFi module 72 that is connected to or is integrated with the data communications module 36. According to one implementation, the external WiFi module 72 may be independent of the on-board WLAN access points 46, 48 and the wireless local area networks established thereby. The external WiFi module 72 may be used to establish data communications links with other similarly equipped aircraft 10, and form ad-hoc wireless networks for transferring data therewith.

The foregoing arrangement of the IFEC system 18, along with its constituent components, have been presented by way of example only and not of limitation. Other aircraft 10 may have any number of different configurations, and may incorporated components that were not mentioned above, or functions may be handled by a different subpart or component than that to which above description attributes. Along these lines, features described above may be omitted from such different configurations.

Figure 2:
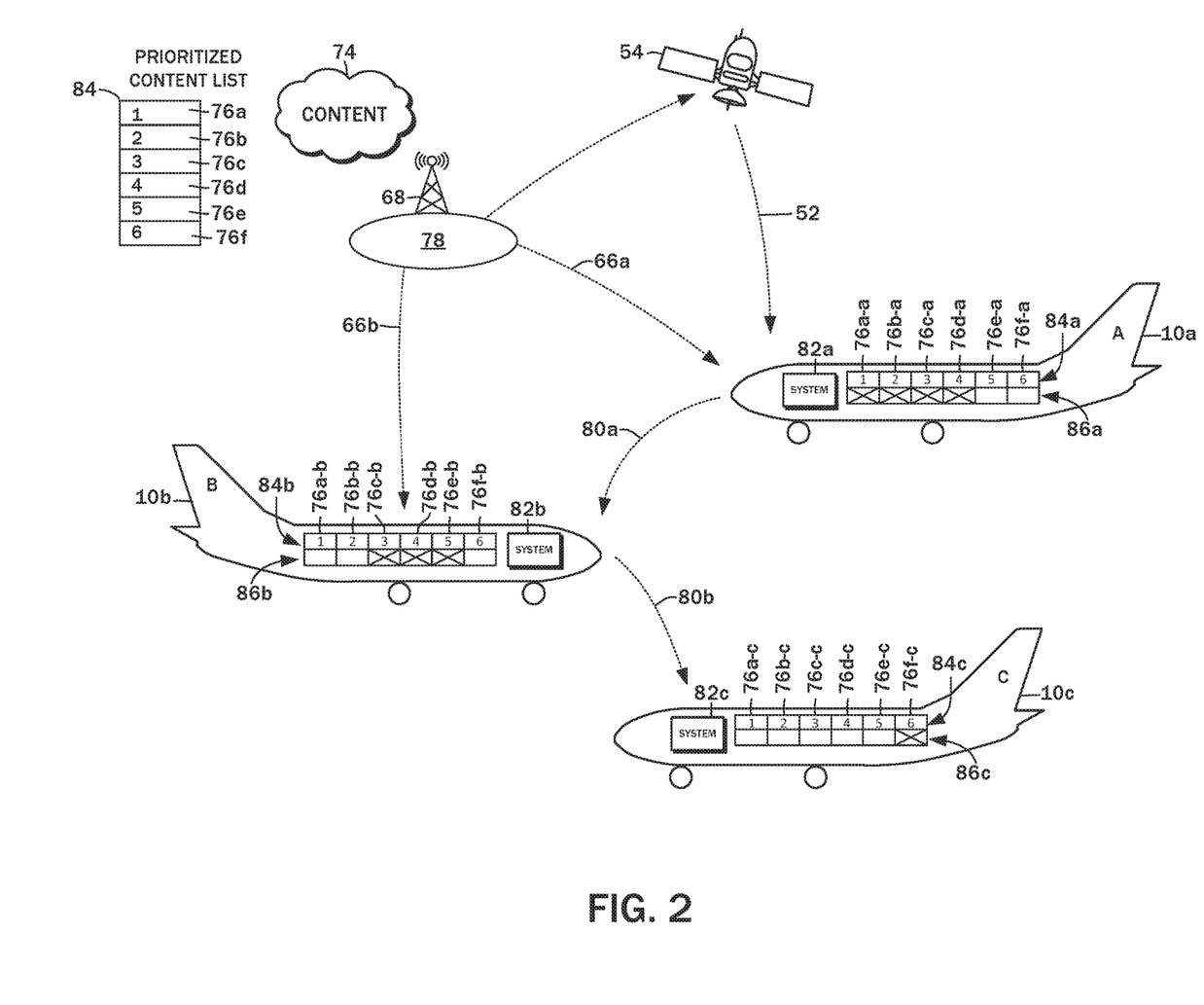
FIG. 2 is a diagram of a system for distributing multimedia content to multiple aircraft via the ad-hoc wireless network.
Figure 3:
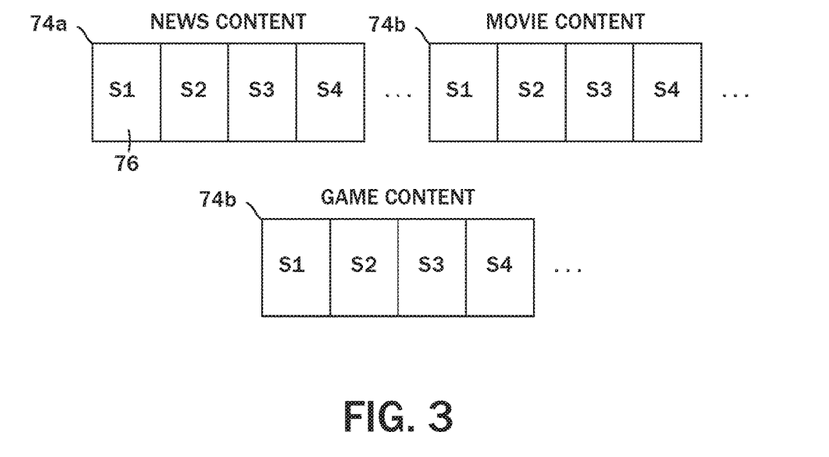
FIG. 3 is a diagram of an exemplary content data comprised of a plurality of segments.

Referring now to the block diagram of FIG. 2, the present disclosure contemplates a system for distributing multimedia content through ad-hoc wireless networks that are initiated by and between the aircraft 10 on the ground. There may be a first aircraft 10a, a second aircraft 10b, and a third aircraft 10c, and according to various embodiments, the system distributes updated multimedia content 74 thereto. As shown in FIG. 3, the content 74 may be categorized into separate types, including, for example, news content 74a, movie content 74b, and game content 74c. Furthermore, each category of the content 74 may be divided into multiple segments 76. Each of the segments may have varying sizes, and can be as small as a few megabytes or as large as a couple hundred megabytes. This specific categorization and segmentation is presented by way of example only, and other or additional categorization and segmentation may be employed without departing from the scope of the present disclosure.

Referring again to the diagram of FIG. 1, the content 74 and all of the segments thereof may be originate at a remote content server 78 that is connected to the Internet 62 or other wide area network. Contemplated in accordance with various embodiments of the present disclosure is the transfer of each such segment of the content 74 to the aircraft 10. Conventionally, the content 74 may be transferred to the aircraft 10 and specifically the onboard IFEC system 18 via content loaders that are physically connected thereto in between flights, via cellular network connections 66, or rarely, over satellite uplinks 52/downlinks 58.

Various embodiments of the system contemplate minimizing the use of such costly data communications modalities. In some cases, when the aircraft 10 is parked at an airport terminal at which there is an existing wireless networking infrastructure, such connection may be utilized to download the content 74. To the extent such infrastructure is not available, the embodiments of the present disclosure instead rely on short-range, ad-hoc wireless networks that are established among multiple aircraft 10 for content data transfers. One wireless networking modality that may be utilized is the aforementioned Wireless Local Area Network (WLAN) also referred to as WiFi (IEEE 802.11), though any other suitable short-range wireless networking module may be substituted.

As the aircraft 10 come within direct communicative range of a WLAN data transfer link, the ad-hoc networks may be established. In the example shown in FIG. 2, the first aircraft 10a may come into proximity with the second aircraft 10b, and a first mesh network segment 80a may be established between the two. The search for other onboard WiFi modules on the other aircraft 10, and initiating of the communications links may begin once the aircraft 10 lands at an airport, that is, when there is a Weight on Wheels (WoW) event. Although the first mesh network segment 80a may be established between the first aircraft 10a and the second aircraft 10b, either may continue to communicate with one or more cellular towers 68 over respective cellular network connections 66a, 66b, as well as the uplink 52 to the communications satellite 54. The third aircraft 10c may come into proximity with the second aircraft 10b, at which point, a second mesh network segment 80b may be established. In the illustrated example, the third aircraft 10c is not yet in direct communicative range with the first aircraft 10a, so no additional mesh network segment is established.

As additional aircraft 10 come within range of one or more of the existing nodes of the mesh network 80, those aircraft also establish respective mesh network segments. Along these lines, as existing aircraft 10 go outside the direct communicative range of one or more of the existing nodes of the mesh network 80, the corresponding mesh network segments are dropped, and the aircraft 10 leave the mesh network 80. In some embodiments, only those aircraft 10 that are part of the same fleet or airline may join the mesh network, though this is by way of example only and not of limitation. Once the mesh network 80 has been established, a host system may manage the network, and if the host system leaves the mesh network 80, one of the remaining nodes may take over the hosting function.

Establishing each of the mesh network segments 80a,b is understood to be performed by the short range wireless networking module, e.g., the external WiFi module 72. However, the higher level functions of mesh network management, along with the distribution of the segments 76 of the content 74 to each of the aircraft 10, may be performed by a content distribution system 82 resident on respective IFEC systems 18 of each aircraft 10. The individual content distribution systems 82 may thus be referred to as a content distribution network node. In utilizing different segments of the mesh network 80 of potentially different speed, available bandwidth, and connectivity, different segments 76 of the content 74 may be transferred at different times to different content distribution systems 82. The present disclosure thus contemplates the orderly transfer of the content 74 across multiple aircraft 10, including the initiating of requests to download content segments 76 not yet stored, and uploading content segments 76 that have been stored but are being requested by other aircraft 10 as not yet being stored thereon.

The remote content server 78 may generate and serve a master content list 84 that identifies each of the segments 76 that are to be transferred. Accordingly, the content distribution network node is understood to be connectible to the remote content server 78 to receive the master content list 84, as well as store the content 74 that is retrieved. As discussed above, the IFEC server 22 and/or the content server 32 that is part of the onboard IFEC system 18 includes one or more data storage devices or a local data repository, e.g., a hard disk drive, solid state drive, etc. on which the content 74 is stored. In an exemplary implementation, the master content list 84 may include a record for a first content segment 76a, a second content segment 76b, a third content segment 76c, a fourth content segment 76d, a fifth content segment 76e, and a sixth content segment 76f. It will be recognized by those having ordinary skill in the art that a typical master content list 84 will include many more content segments 76. The master content list 84 may be transmitted to each of the IFEC systems 18 of the aircraft 10a, 10b, and 10c using different modalities, including the aforementioned cellular network connections 66, the satellite uplink 52/downlink 58, or the mesh network segments 80a,b upon first connecting to an upstream or host mesh node.

A first copy of the master content list 84a stored on the first aircraft 10a thus identifies six segments, shown as a first content segment 76a-a, a second content segment 76b-a, a third content segment 76c-a, a fourth content segment 76d-a, a fifth content segment 76e-a, and a sixth content segment 76f-a. Likewise, a second copy of the master content list 84a stored on the second aircraft 10b also identifies the same six segments, shown as a first content segment 76a-b, a second content segment 76b-b, a third content segment 76c-b, a fourth content segment 76d-b, a fifth content segment 76e-b, and a sixth content segment 76f-b. A third copy of the master content list 84b stored on the third aircraft 10c identifies six segments, including a first content segment 76a-c, a second content segment 76b-c, a third content segment 76c-c, a fourth content segment 76d-c, a fifth content segment 76e-c, and a sixth content segment 76f-c.

The master content list 84 is compared against a local inventory 86 of each segment 76 of the content 74 that is already stored on the IFEC system 18 to determine which segments are to be downloaded from a remote source (either the remote content server 78 or other upstream content distribution systems 82 onboard other aircraft 10) as well as which segments 76 are available to be transferred to a remote destination that is requesting the same. Continuing with the example of FIG. 2, the first content segment 76*a-a*, the second content segment 76*b-a*, the third content segment 76*c-a*, and the fourth content segment 76*d-a* have been evaluated to be stored on the first aircraft 10*a*. The fifth content segment 76*e-a* and the sixth content segment 76*f-a* have been evaluated as being absent on the first aircraft 10*a*, so if there is no other source hosting such segments, the content distribution system 82 is contemplated to make a direct request to the remote content server 78 via the cellular network connection 66, the satellite uplink 52, or other metered or limited network connection.

Upon the second aircraft 10*b* connecting to the mesh network 80, it may be determined, for example, that the third content segment 76*c-b* and the fourth content segment 76*d-b* have already been stored. Thus, the second aircraft 10*b* needs the first content segment 76*a-b* and the second content segment 76*b-b*. These segments are understood to be available from the first aircraft 10*a*, to which the second aircraft 10*b* is connected over the first mesh network segment 80*b*. Instead of requesting it from the remote content server 78 directly, the content distribution system 82 may request it from the first aircraft 10*a*. The evaluation/comparison may further determine that the fourth content segment 76*d-b* has already been stored on the second aircraft 10*b*, and thus makes it available for other nodes to download. Accordingly, when the first mesh network segment 80*a* is established, the first aircraft 10*a* may request the missing fifth content segment 76*e-a* from the second aircraft 10*b*. Notwithstanding the availability of the fourth content segment 76*d-b* on the second aircraft 10*b*, depending on the connection speed and other factors that may be evaluated by the content distribution system 82*a*, it may nevertheless be retrieved from the remote content server 78 over a metered, though potentially faster or more reliable connection thereto. Both the first aircraft 10*a* and the second aircraft 10*b* lack the sixth content segment 76*f*, so it may be necessary to request the same from the remote content server 78 directly over the cellular network connection 66, the satellite uplink 52, or other metered or limited network connection.

To the extent the third aircraft 10*c* has the sixth content segment 76*f-c*, when the second mesh network segment 80*b* is established, the content distribution system 82*c* on the third aircraft 10*c* may push the same to the second aircraft 10*b*. This may further be pushed or propagated to the first aircraft 10*a* by the content distribution system 82*b* on the second aircraft 10*b*. Instead of a sender-initiated push, it is also possible for a request to be initiated, and the source content distribution system 82 may respond to such request by starting the transfer of the stored content segment 76. The foregoing general procedure may thus result in all of the aircraft 10 in the mesh network 80 to have the same content 74 in a shorter period of time with fewer individual data transmission burdens requiring costly metered connections such as the cellular network connection 66.

The system for distributing content is envisioned to be extended beyond serial point-to-point links as illustrated in FIG. 2. More complex mesh networks may be formed, such as that illustrated in FIG. 4. In this example, there is a first group of nodes or aircraft 10*a*-10*e* defining a first mesh network 88*a*. Each of the nodes within the first mesh network 88*a* may communicate with each other to distribute the content 74 identified in the master content list 84 as discussed above. There is also a second group of nodes or aircraft 10*f*-10*j* defining a second mesh network 88*b*. A single node in the first mesh network 88*a*, e.g., fourth aircraft 10*d*, and a single node in the second mesh network 88*b*, e.g., sixth aircraft 10*f*, may be designated as the inter-network nodes for transferring content segments 76 that are not present with the respective mesh networks 88*a*, 88*b*. Accordingly, it is not necessary for all of the aircraft 10 in the first mesh network 88*a* to connect to all of the aircraft 10 in the second mesh network 88*b* to distribute the content 74.

Within the mesh network 80, each of the nodes or content distribution systems 82 eventually retrieves all of the content 74 for local storage in the IFEC system 18 with which it is associated. That is, the content 74 is stored on the storage devices connected the IFEC server 22 or content server 32.

The content distribution system 82 is understood to evaluate whether certain segments 76 are missing, and request the missing segments from other content distribution systems 82 of other aircraft 10 within the mesh network 80. The content distribution system 82 that has that particular requested segment sends the same to the requesting aircraft/content distribution system 82 requesting it over the mesh network segment interconnecting the two. If neither of the content distribution systems 82 have the missing segment, or if new content 74 is to be distributed to the fleet, selected aircraft 10/content distribution systems 82 begin downloading the segments 76 from the remote content server 78. It is possible to reduce the duration of the data transfer if multiple content distribution systems 82 across multiple aircraft 10 begin downloading different segments, and sharing within the mesh network 80 may begin as such downloads proceed.

Figure 5:
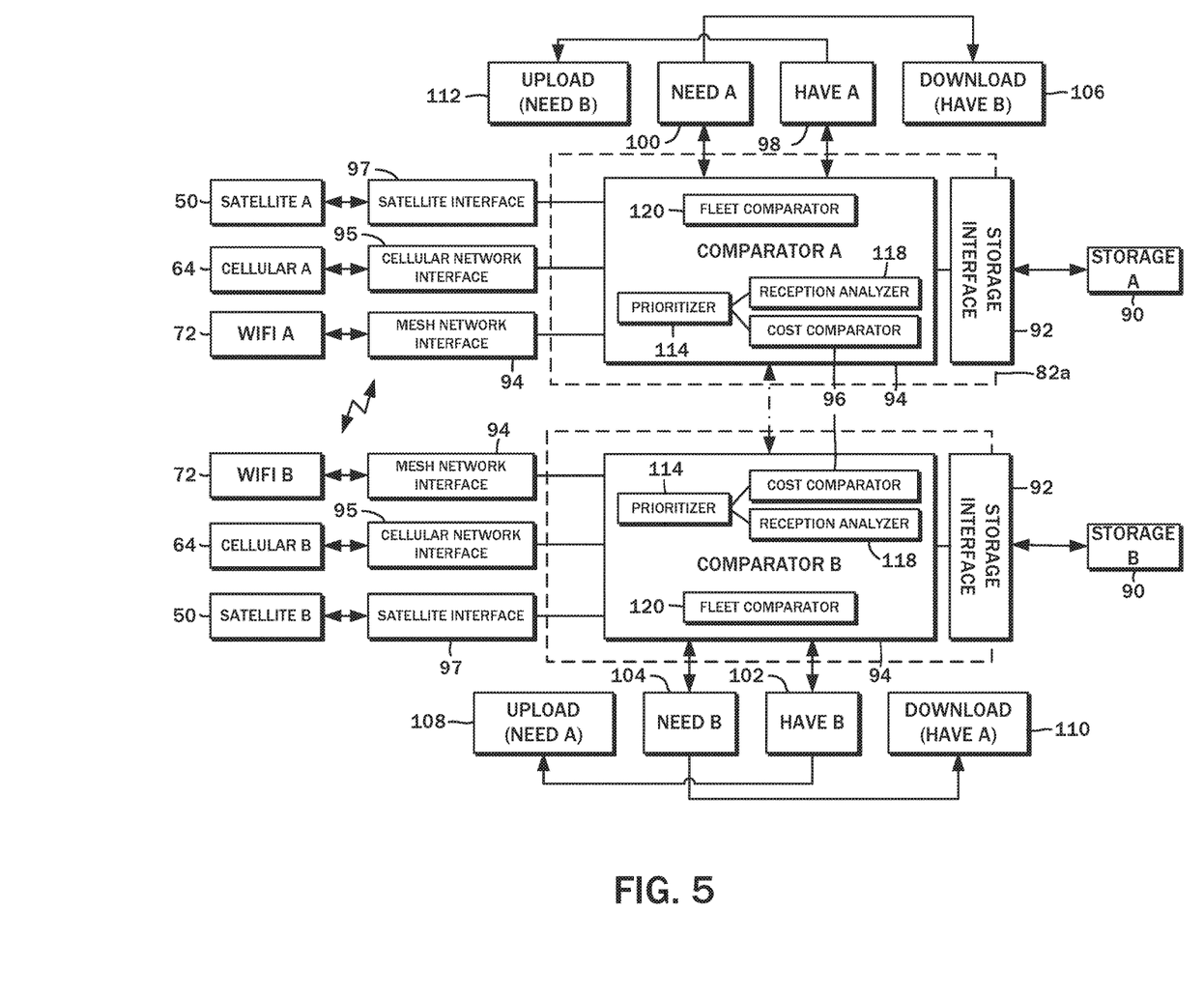
FIG. 5 is a block diagram of the components of the system.

Having described the overall functional features of a system for distributing content over ground-based ad-hoc wireless networks, additional details of one embodiment of the content distribution system 82 will be considered in conjunction with the block diagram of FIG. 5. In the diagram, two content distribution systems 82 (first content distribution system 82*a* and a second content distribution system 82*b*) in order to illustrate the downstream and upstream content distribution features. Although the downstream content distribution features are described in the context of the first content distribution system 82*a* to the second content distribution system 82*b*, the functions associated with and described in the context of the second content distribution system 82*b* are understood to be applicable to the first content distribution system 82*a*. Along these lines, the features or components set forth only in the context of one of the first or second content distribution systems 82, are understood to be present in the other.

According to various embodiments, the content distribution system 82 stores and manages the distribution of data to other IFEC systems 18. In this regard, there is understood to be a local content data repository 90, which may be the aforementioned hard disk drive, solid state drive, or other data storage device. The content distribution system 82 includes a storage interface 92 that is connected to the local content data repository 90, and in addition to retrieving an inventory of the segments 76 of content 74 stored thereon, the actual data may be directly manipulated. In other words, the storage interface 92 provides the facilities to write data to and read data from the local content data repository 90.

Each of the content distribution systems 82 are also understood to establish segments of the mesh network 80, that is, mesh network data communications links, with one or more other content distribution systems 82 on other aircraft 10. As described above, WiFi or other short range data transfer links are initiated and maintained by the external WiFi module 72. Thus, WiFi protocol-level functions are performed by the external WiFi module 72, though higher level mesh network logical functions are performed by the content distribution system 82, with a mesh network interface 94 serving to make accessible the data and functions of the external WiFi module 72 to the content distribution system 82.

It is understood that other data communications modalities may be utilized to transfer data, including cellular/mobile networks, and the IFEC system 18 thus includes the cellular modem 64. Similar to the external WiFi module 72, the cellular network-level functions are performed by the cellular modem 64, while the broader data transfer functions and client/server handshaking procedures are performed by the content distribution system 82 over a cellular network interface 95. Furthermore, satellite communications may also be utilized, and so the IFEC system 18 includes the satellite module 50. The particulars of establishing the uplink to/from the communications satellite 54 may be handled by the satellite module 50, with higher level functions being performed by the content distribution system 82. A satellite interface 97 is understood to link the content distribution system 82 to the discrete functions provided by the satellite module 50.

The content distribution system 82 further includes a comparator 96 that performs the aforementioned comparison, data retrieval, and data forwarding functions. As shown in the block diagram of FIG. 5, the comparator 96 is in communication with the local content data repository 90 over the storage interface 92. Furthermore, the comparator 96 has access to the master content list 84 that specifies all of the available segments 76 of the content 74 that is to be propagated to the aircraft fleet and available from the remote content server 78. This master content list 84 is compared against the local inventory of the segments 76 of the content 74 that is stored in the local content data repository 90.

From the perspective of the first content distribution system 82a, there may be a status indicator of content data segments that it has, shown as "HAVE A," 98 along with a status of content data segments that it needs, shown as "NEED A." 100. Similarly, from the perspective of the second content distribution system 82b, there may be a status of content data segments that it has, per status "HAVE B" 102, together with a status of content data segments that it needs, shown as "NEED B" 104. The first comparator 96a thereafter requests the needed content segments (NEED A 100) from another node (e.g., the second content distribution system 82b), as identified in the status HAVE B 102. The first content distribution system 82a then initiates the download per block 106, and the second content distribution system 82b initiates the upload per block 108. Along the same lines, the second comparator 96b requests the needed content segments (NEED B 104) from another node (e.g., the first content distribution system 82a) as identified in the status HAVE A 98. The second content distribution system 82b initiates the download per block 110, and the first content distribution system 82a initiates the upload per block 112. Although the process of requesting and transferring the segments 76 of content 74 have been illustrated with only two of the content distribution systems 82a, 82b, it will be within the purview of those having ordinary skill in the art to extend the process to additional content distribution systems 82.

In addition to the basic have/need evaluations performed by the comparator 96, additional evaluations may be made to determine the optimal mesh network path for the transfer of specific segments 76 of content 74, and prioritize multiple transfers. Accordingly, the comparator 96 may include a prioritizer 114 that sets the order of the missing content segments list based upon certain predetermined criteria such as the category of content (recent or urgent news being prioritized for propagation across the fleet faster than movies, etc.), the total size of all of the content 74 that is part of a single unit of multimedia content, and so on. The comparator 96 may also include a cost comparator 116 that evaluates data transfer expenses for transferring the segments 76 of content 74 from any one of the available upstream sources, and prioritizing, selecting, or avoiding those data transmission segments that are more expensive. The cellular modem 64 may connect to different or multiple cellular networks, and the cost comparator 116 may evaluate between each to determine the lowest cost. For example, roaming on one network depending on the location of the aircraft, versus in-plan on another network, may be evaluated.

Some segments in the mesh network 80 are understood to have better, faster, or more reliable data transmission links than others, and the present disclosure contemplates the comparator selecting those that are optimal for the download/procedure. This evaluation may be performed by a reception analyzer 118 that evaluates the Received Signal Strength Indicator (RSSI) or other metric.

Figure 4:
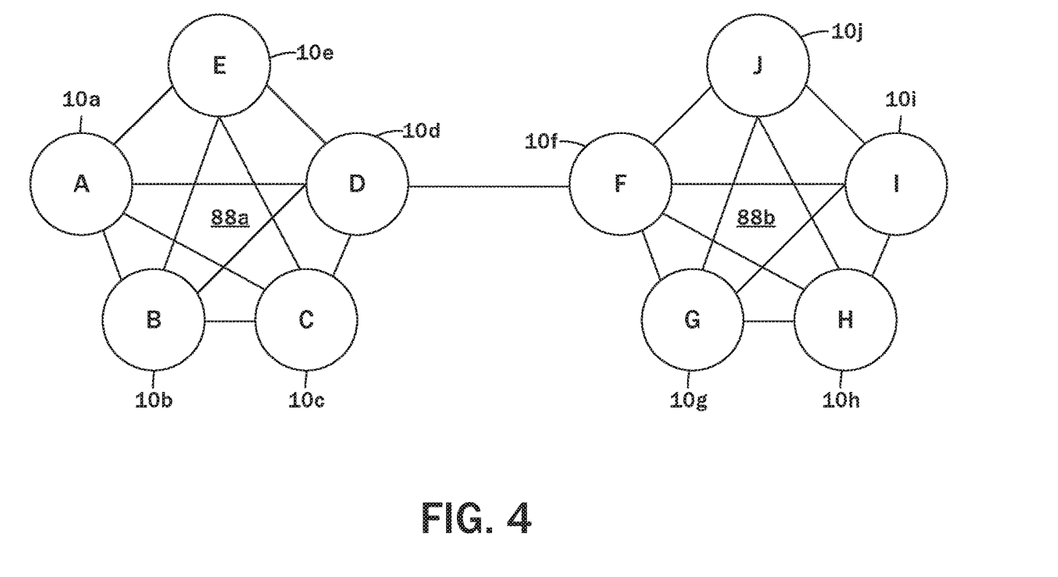
FIG. 4 is a network diagram illustrating groups of interconnected content distribution nodes.

The comparator 96 may also incorporate a fleet comparator 120 that determines which of the segments 76 of the content 74 are available within a group of content distribution systems 82 such as the first mesh network 88a and the second mesh network 88 illustrated in FIG. 4. Based on such an evaluation, a specific node for connecting to the representative node of the other mesh network may be selected, and well as identify which segments 76 of the content 74 may be retrieved from the other mesh network.

Another embodiment of the present disclosure contemplates a method for distributing multimedia content to multiple IFEC systems 18 utilizing, for example, the content distribution system 82 described above. In one embodiment, the method may be implemented as non-transitory, computer-readable instructions executed by the IFEC system 18. Referring now to the flowcharts of FIGS. 6A and 6B, this method may begin with a step 1000 of initiating a first mesh network data communications link with a different content distribution system 82 that may be deployed to, for example, a second aircraft 10b. This method is understood to be performed by the local content distribution system 82.

Figure 6A:
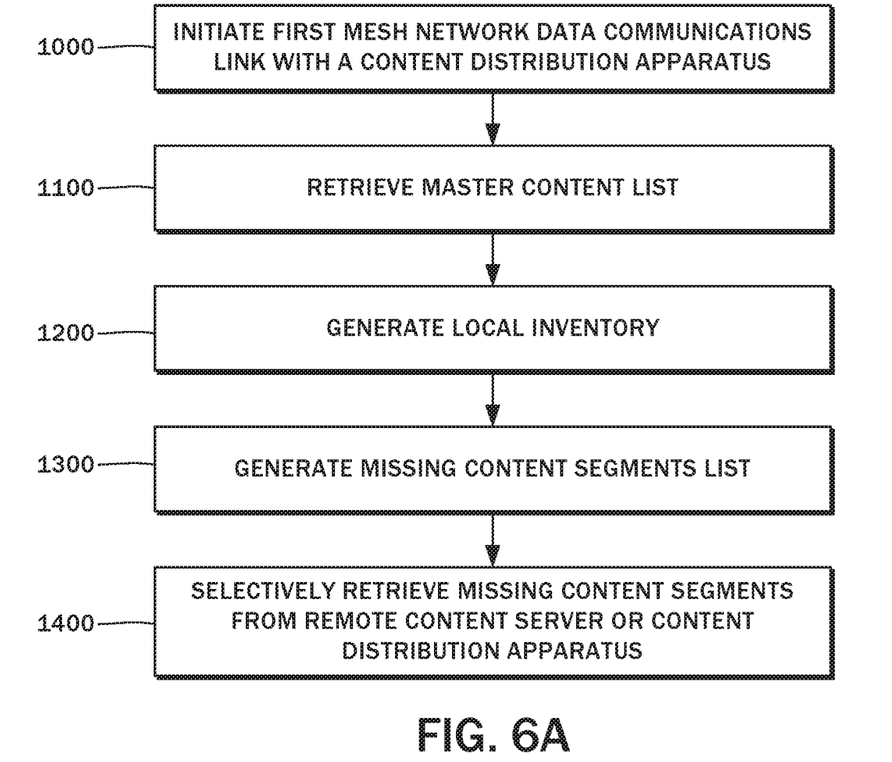
FIGS. 6A and 6B are flowcharts illustrating a method for distributing content in accordance with another embodiment of the present disclosure.

The method continues with a step 1100 of retrieving the master content list 84, which specifies the plurality of segments 76 of the content 74 that is available from the remote content server 78. A local inventory of the segments 76 of the content 74 stored on the local content data repository 90 is generated according to a step 1200. This step may be performed by the aforementioned comparator 96. Thereafter, in a step 1300, a missing content segments list is generated from a comparison of the master content list 84 and the local inventory. Having identified the missing content, the method proceeds to a step 1400 of selectively retrieving the segments 76 of the content 74, from either the remote content server 78 or the upstream content distribution system 82 that possesses the missing segment. The transfer from the remote content server 78 may take place over the cellular network connection 66 or the satellite uplink 52/downlink 58, while the transfer from the content distribution system 82 may take place over the mesh network 80.

Figure 6B:
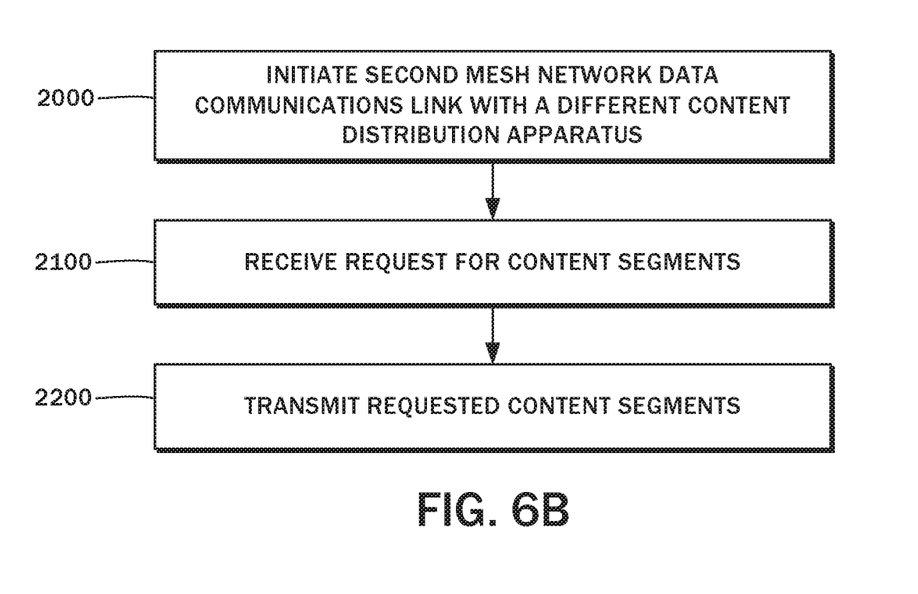

The content distribution system 82 may also implement downstream distribution of content stored thereon, and the method is shown in the flowchart of FIG. 6B, beginning with a step 2000 of establishing a second mesh network data communications link with another content distribution system 82 that may be deployed to, for example, a third aircraft 10c. These steps are also performed by the local content distribution system 82. There is a subsequent step 2100 of receiving a request for one or more segments 76 of the content 74 that is stored in the local content data repository 90. Based on this request, the method proceeds to a step 2200 of transmitting the requested one or more segments 76 of the content 74 to the third aircraft 10c over the second mesh network data communications link.

The particulars shown herein are by way of example and for purposes of illustrative discussion of the embodiments the content distribution system and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A content distribution apparatus onboard a vehicle periodically travelling within direct communicative range of other content distribution apparatuses onboard respective other vehicles, the apparatus comprising:
    a storage interface to a local content data repository, one or more segments of content data being stored on the local content data repository;
    a mesh network interface establishing one or more mesh network data communications links with one or more other content distribution apparatuses of the other vehicles while being within direct communicative range thereof; and
    a comparator in communication with the local content data repository over the storage interface, a missing content segments list being generated by the comparator based upon an evaluation of a master content list of each segment of content data available from a remote content server against a local inventory of the segments of content data stored in the local content data repository, the comparator requesting one or more segments of the content data in the missing content segments list from one or more upstream source content distribution apparatus over a first one of the mesh network data communications links, and transmitting one or more segments of the content data in the local inventory and stored in the local content data repository in response to a request therefor from a downstream requestor content distribution apparatus over a second one of the mesh network data communications links.

2. The apparatus of claim 1, wherein the comparator includes a prioritizer, an order of the missing content segments list for transferring the segments of content data from the one or more upstream source content distribution apparatus being set by the prioritizer based upon predetermined criteria.

3. The apparatus of claim 1, wherein the comparator includes a cost comparator evaluating data transfer expenses for transferring the one or more segments of the content data from respective ones of the one or more upstream source content distribution apparatus.

4. The apparatus of claim 1, further comprising a cellular network interface establishing a direct communications link to the remote content server, the comparator requesting one or more segments of the content data in the missing content segments list from the remote content server over the direct communications link.

5. The apparatus of claim 4, wherein the comparator includes a network reception analyzer, the requests for the one or more segments of the content data in the missing content segments list being made to selected ones of the one or more upstream source content distribution apparatus and the remote content server, the selection being made by the network reception analyzer based upon an evaluation of the one or more mesh network data communications links and the direct communications link thereto.

6. The apparatus of claim 1, wherein the multi-mode network interface includes a wireless local area network (WLAN) module.

7. The apparatus of claim 6, wherein the first one of the one or more mesh network data communications links is established by the wireless local area network module to receive the one or more segments of the content data in the missing content segments list.

8. The apparatus of claim 6, wherein the second one of the one or more mesh network data communications links is established by the wireless local area network module to transmit the one or more segments of the content data to the downstream requestor content distribution apparatus.

9. The apparatus of claim 1, wherein the mesh network data communications links are initiated in response to an aircraft weight on wheels event.

10. A system for wirelessly distributing multimedia content to in-flight entertainment systems of a plurality of aircraft, the system comprising:
    a first distribution network node connectible to a remote content server over a first direct communications link to receive a master content list of a plurality of segments of the multimedia content available from the remote content server, the first distribution network node including a first local data repository to store at least one of the plurality of segments of the multimedia content;
    a second distribution network node selectively connectible to the remote content server over a second direct communications link and the first distribution network node over a first mesh network connection link therewith, the second distribution network node including a second local data repository to store one or more of the plurality of segments of the multimedia content retrieved from the first distribution network node based upon an evaluation of the first mesh network connection link and the second direct communications link; and
    a third distribution network node selectively connectible to the remote content server over a third direct communications link, the first distribution network node over a second mesh network connection therewith, and the second distribution network node over a third mesh network connection therewith, the third distribution network node including a third local data repository to store one or more of the plurality of segments of the multimedia content retrieved from the either or both of the first distribution network node and the second distribution network node based upon an evaluation of the second mesh network connection link, the third mesh network connection link, and the third direct communications link.

11. The system of claim 10, wherein selection of the one or more of the plurality of segments of the multimedia content for retrieval from the first distribution network node is based upon the master content list and an evaluation of existing segments of the multimedia content on the second local data repository.

12. The system of claim 10, wherein a first set of the plurality of segments of the multimedia content is transferred to the third distribution network node from the first distribution network node over the second mesh network connection link, and a second set of the plurality of segments of the multimedia content is transferred to the third distribution network node from the second distribution network node over the third mesh network connection link.

13. The system of claim 12, wherein the first set of the plurality of segments of the multimedia content and the second set of the plurality of segments of the multimedia content are transferred concurrently.

14. The system of claim 12, wherein a third set of the plurality of segments of the multimedia content is transferred to the third distribution network node from the remote content server over the third direct communications link.

15. The system of claim 10, further comprising:
a fourth distribution network node selectively connectible to the remote content server over a third direct communications link and to the third distribution network node over a fourth mesh network connection link therewith, the fourth distribution network node including a fourth local data repository to store one or more of the plurality of segments of the multimedia content retrieved from the third distribution network node based upon an evaluation of the fourth mesh network connection link and the third direct communications link.

16. The system of claim 10, wherein:
the first direct communications link is a cellular network connection; and
the first mesh network connection link is a wireless local area network connection established upon a first aircraft on which the first distribution network node is installed coming within a direct communicative range of a second aircraft on which the second distribution node is installed.

17. The system of claim 10 wherein the first mesh network communications link is initiated in response to an aircraft weight on wheels event.

18. A non-transitory computer-readable medium connected to an in-flight entertainment and communications system and including instructions executable by the in-flight entertainment and communications system for performing a method for distributing multimedia content thereto, the method comprising:
initiating a first mesh network data communications link with a first content distribution apparatus on a second aircraft upon being within direct communicative range thereof;
retrieving a master content list of a plurality of segments of content data available from a remote content sever;
generating a local inventory of segments of content data stored on a local data repository;
generating a missing content segments list based upon a comparison of the master content list against the local inventory;
selectively retrieving the segments of content data identified in the missing content segments list from either one or both of the remote content server over a first data communications link, and the first content distribution apparatus over the first mesh network data communications link;
establishing a second mesh network data communications link with a second content distribution apparatus on a third aircraft upon being with direct communicative range thereof;
receiving a request for one or more segments of content data stored in the local data repository; and
transmitting the requested one or more segments of content data to the second content distribution apparatus on the third aircraft over the second mesh network data communications link.

19. The non-transitory computer-readable medium of claim 18, wherein the segments of content data identified in the missing content segments list are associated with an order for transferring the segments of content data identified in the missing content segments list.

20. The non-transitory computer-readable medium of claim 19, wherein the order of the missing content segments list is based upon predetermined criteria.

* * * * *